INVENTOR
JON BROWN

BY Albert J. Kramer

ATTORNEY

INVENTOR
JON BROWN

BY Albert J. Kramer

ATTORNEY

Aug. 13, 1968 J. BROWN 3,396,857

STACKER DEVICE

Filed April 22, 1966 7 Sheets-Sheet 3

INVENTOR
JON BROWN

BY Albert J. Kramer
ATTORNEY

STACKER DEVICE

Filed April 22, 1966 7 Sheets-Sheet 4

INVENTOR
JON BROWN

BY Albert J. Kramer

ATTORNEY

INVENTOR
JON BROWN

BY Albert J. Kramer

ATTORNEY

Aug. 13, 1968 J. BROWN 3,396,857

STACKER DEVICE

Filed April 22, 1966 7 Sheets-Sheet 6

INVENTOR
JON BROWN

BY Albert J. Kramer

ATTORNEY

INVENTOR
JON BROWN

BY Albert J. Kramer

ATTORNEY

United States Patent Office 3,396,857

Patented Aug. 13, 1968

3,396,857

STACKER DEVICE

Jon Brown, Garland, Tex., assignor to Maryland Cup Corporation, Owings Mills, Md., a corporation of Maryland Filed Apr. 22, 1966, Ser. No. 544,529

10 Claims. (Cl. 214—6)

ABSTRACT OF THE DISCLOSURE

An auxiliary device is provided in association with a container filling machine for stacking filled containers discharged by the filling machine. The device is integrated with the machine and comprises means for elevating the filled containers one by one from apertures in a rotating loading wheel. As each container is sequentially elevated, a carrier mechanism engages the lowermost container and carries it together with any containers above it to a discharge station where a belt conveyor is disposed. The carrier is so programmed as not to release the container at the discharge station until a predetermined number of containers are in place forming a stack. Instead, it is returned to its initial position where another container is added to the stack from the bottom by the elevating means, the lowermost container of the stack being released and re-engaged during this operation. This continues until a predetermined number of containers are in the stack, whereupon a final disengagement takes place to release the stack from the carrier and permit the entire stack to be discharged onto the belt conveyor.

This invention relates to stacking devices and it is more particularly concerned with the provision of a device for collecting a group of articles in the form of a stack to be placed in a carton for storage and shipment.

The invention is particularly adapted to a machine of the type described in U.S. Patent No. 3,225,889, when used to manufacture articles having flat tops and bottoms.

The general object of the invention is the provision of a device for arranging such articles in stacks prior to delivering them to a station for packing in cartons.

Another object is the provision of such a device which functions automatically after the articles have been completely formed.

A still further object is the provision of an article stacking device which functions by removing articles from consecutive apertures of a rotating horizontal wheel and transferring them in stack form to a delivery station.

A still further object is the provision of such means which can be adjusted to provide stacks of different heights.

A still further object is the provision of such a device which can be attached directly to the filling machine and which receives its driving force from a power take-off of the machine without the need for any external driving means.

A still further object is the provision of such a device which is reliable in operation, positive in action, long wearing, and which requires a minimum of maintenance.

These objects and still further objects, advantages and features of the invention will appear more fully from the following description considered together with the accompanying drawing.

Figure 1:
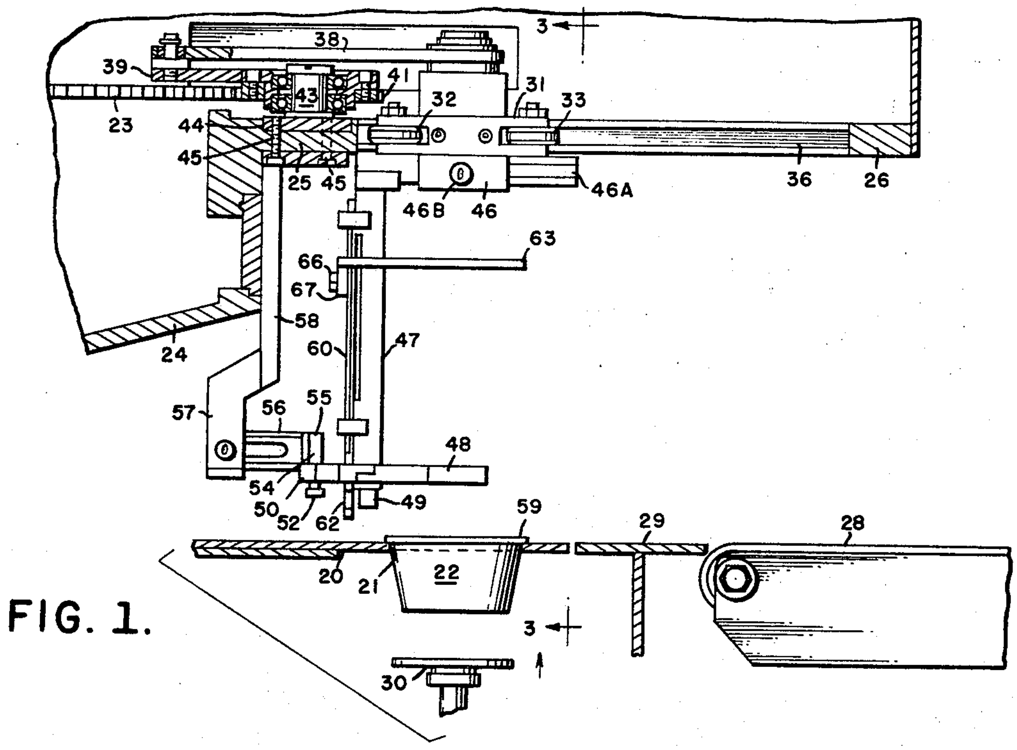
FIG. 1 is a vertical sectional view of an embodiment of the invention in relation to a filling machine of the type mentioned, the filling machine being shown fragmentarily.
Figure 2:
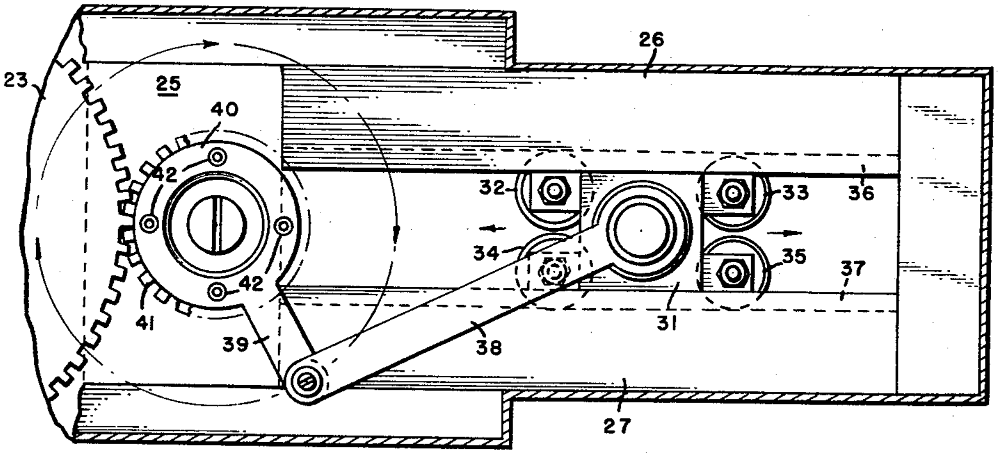
FIG. 2 is a top plan view of the embodiment as shown in FIG. 1.

Referring to the drawing with more particularity the embodiment, although applicable to other types of machines, is illustrated in relation to a preferred type of machine of said Patent No. 3,225,889. This machine comprises a horizontal loading wheel 20 provided with apertures 21 for holding containers 22 of the open top type and which are to be filled and closed at various stations defined by auxiliary units attached to the machine.

A driving gear 23 is contained in a housing 24 above the loading wheel 20. This housing is structurally capable of supporting various auxiliary units needed, including the device of the present invention.

The embodiment shown in the drawing comprises a platform 25 having a pair of parallel horizontal beams 26 and 27 extending outwardly. The inner end of the platform is supported by the housing 24 by any conventional means. The outer ends of the beams 26 and 27 overhand the receiving end of a belt conveyor 28 which is mounted adjacent a stationary table 29 at the delivery station of the wheel 20. The conveyor may extend to a packing station (not shown). At this point in the rotation of the wheel, an elevating member 30 is cyclicly actuated to raise from the loading wheel 20 the containers 22 and move them to a position directly thereabove as fully explained in said Patent No. 3,225,889.

Between the beams 26 and 27 a carriage 31 is disposed for horizontal reciprocation. This carriage is supported by horizontal wheels 32, 33 and 34, 35 which engage grooved tracks 36 and 37, respectively, of the beams 26 and 27.

The carriage 31 is reciprocated by a linkage comprising a connecting rod 38 and a crank arm 39. The crank arm is integral with a ring 40 that is fixed to the top side of a horizontal spur gear 41 by means of bolts 42. The gear 41 is mounted on conventional bearings of a vertical shaft 43 in meshed relation with the driving gear 23.

The shaft 43 has a bottom flange 44 which is secured to the platform 25 by means of bolts 45.

The inner end of the connecting rod 38 is pivotally connected to the outer end of the crank arm 39 and the outer end of the connecting rod is pivotally connected to the center of the carriage 31 by conventional connecting means.

The carriage 31 has a portion 46 that extends below the plane of the platform 25. To the inner side of the portion 46 there is adjustably attached by an engaging T-slide 46A and secured by set screw 46B a pair of vertical suspenders 47, 47. These suspenders and parts associated therewith are identical to each other. The use of two of them increases overall efficiency.

The suspenders are spaced apart by the same distance as consecutive apertures 21 of the wheel 20 thereby permitting simultaneous operation at two adjacent discharge stations.

Figure 17:
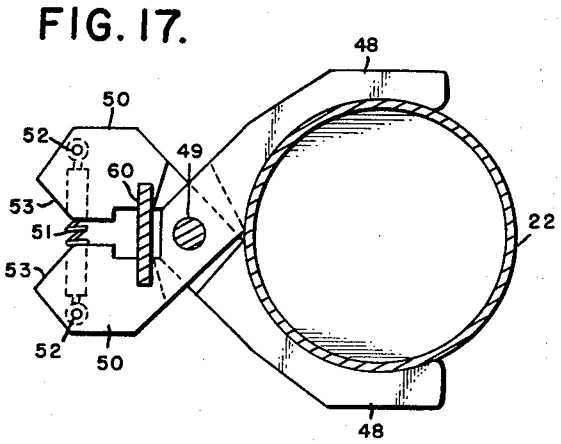
FIG. 17 is a sectional view along the line 17—17 of FIG. 5.
Figure 15:
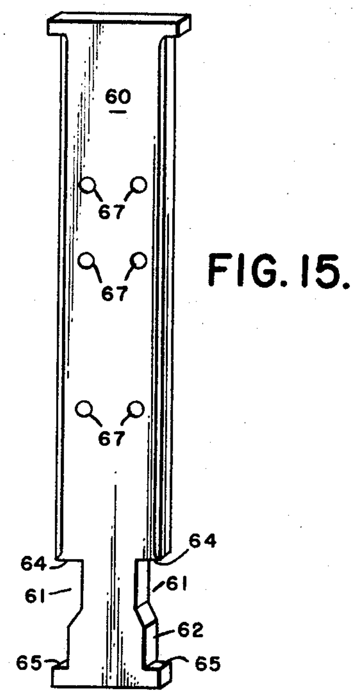
FIG. 15 is an isometric view of the shiftable vertical bar member which controls the operation of the article holding fingers.
Figure 18:
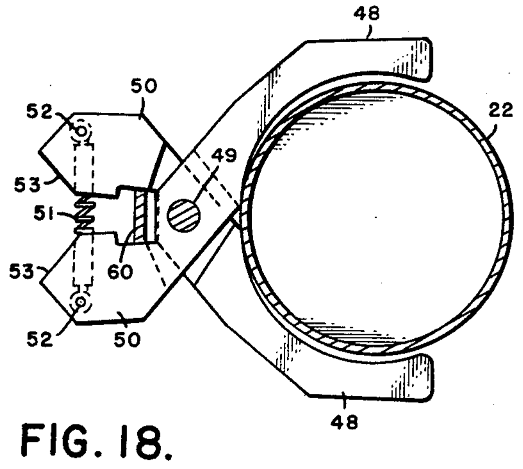
FIG. 18 is a sectional view along the line 18—18 of FIG. 11.

At the lower end of each of the suspenders 47 there is mounted a pair of scissors-like fingers 48, 48. These fingers are mutually pivoted to each other and to corresponding suspender 47 by means of a vertical pivot bolt 49. Extensions 50, 50 of the fingers are attached to either end of a coil spring 51 by bolts 52, 52 which biases the extensions towards each other and, hence, urge the fingers toward each other for article contact relation. See FIGS. 17 and 18. The extensions are also provided with adjacent angular camming surfaces 53, 53 which are adapted to contact the opposite corresponding sides 54, 54 of a V shaped camming member 55. The member 55 is secured to the outer end of a bar 56 and its inner end is fixed to the foot 57 of a stationary suspender 58 secured to the platform 25.

Figure 4:
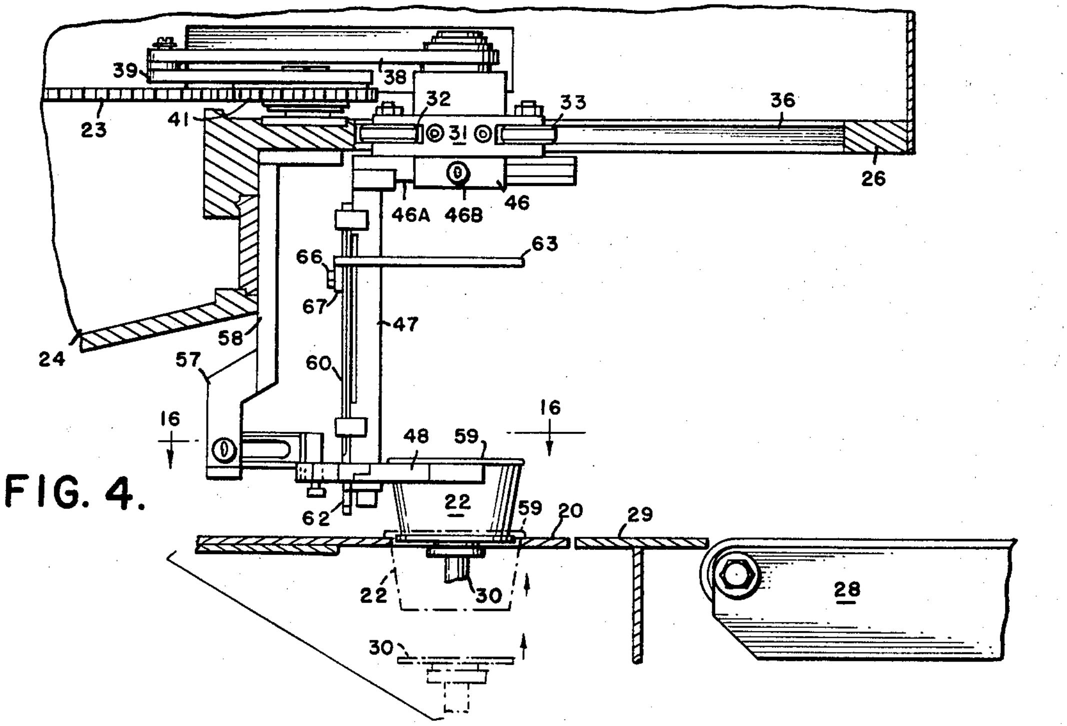
FIG. 4 is a view similar to FIG. 1 showing the device in an initial stage of its cycle of operation.
Figure 5:
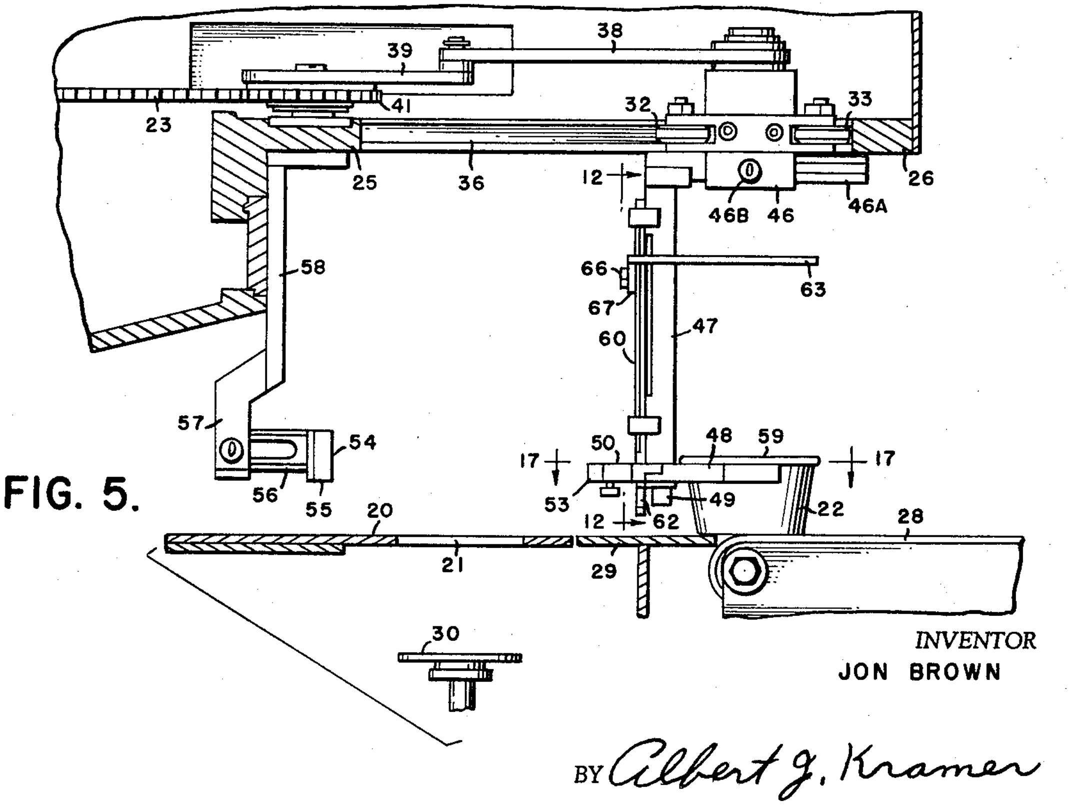
FIGS. 5, 6, 7, 8, 9, 10 and 11 are views similar to FIG. 4 showing successive stages of the device in a cycle of operation.

By these means as the fingers move into their article receiving positions above a container 22 in an aperture of the wheel 20, the elevating member 30 moves upward and carries the container to a position between the fingers held open by the cam 55 against the action of the spring 51. See FIG. 4. While the container is still retained by the elevating member 30 in the position between the fingers 48, 48 the carriage 31 is moved by the linkage towards the delivery station, whereby the extensions 50, 50 are released from the cam 54. This permits the spring 51 to close the fingers against the side wall of the container. The containers are preferably provided with a rim flange 59 and the parts are so proportioned that this flange rests on the fingers in their closed position to provide a more positive holding action. This holding action by the fingers 48, 48 maintains the container above the wheel 20 by an amount sufficient to clear the flange 59 of a succeeding container while the member 47 is horizontally reciprocated.

Figures 3, 12, 13, 14:
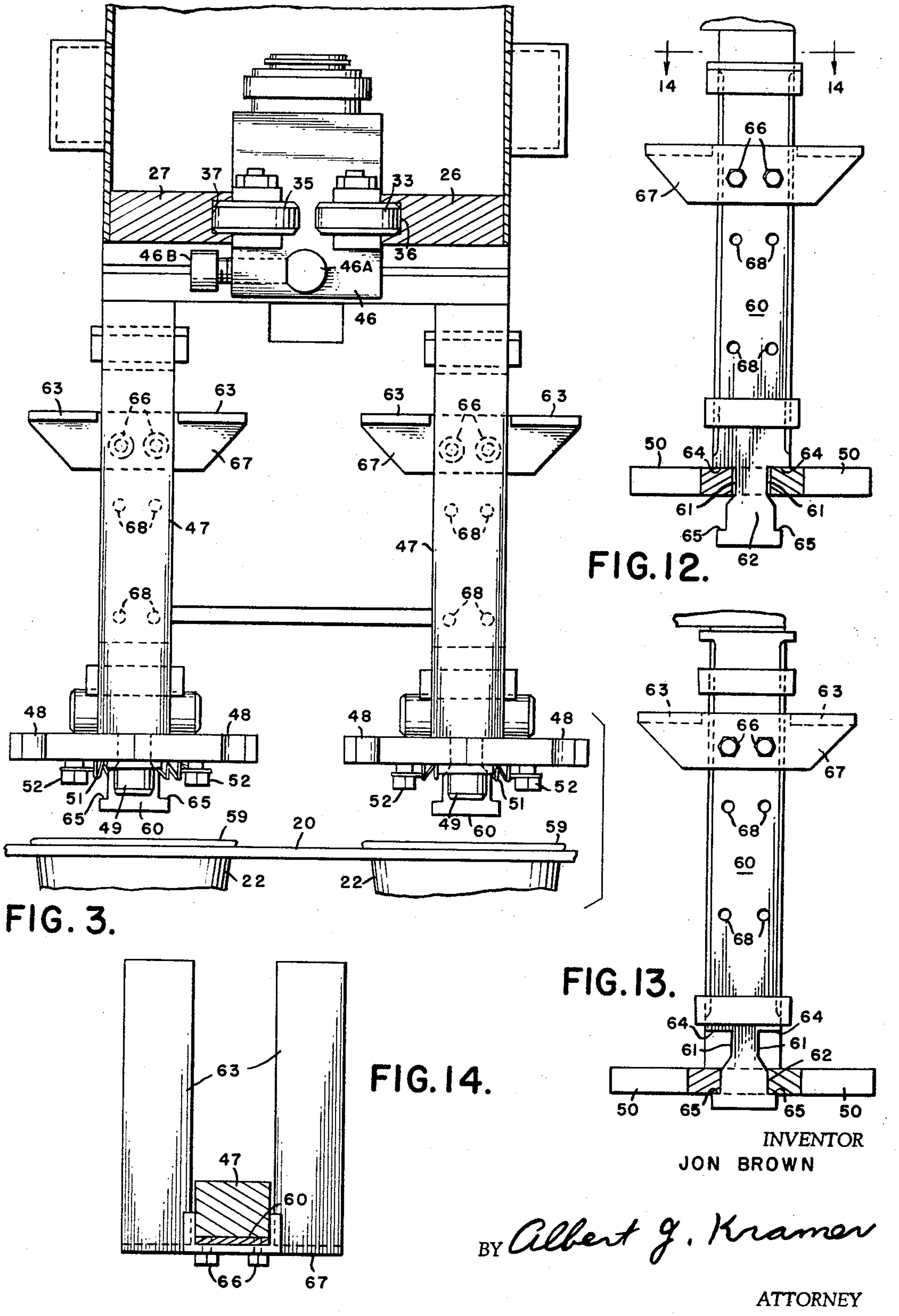
FIG. 3 is a transverse sectional view along the line 3—3 of FIG. 1.
FIG. 12 is a sectional view along the line 12—12 of FIG. 5.
FIG. 13 is a sectional view along the line 13—13 of FIG. 11.
FIG. 14 is a sectional view along the line 14—14 of FIG. 12.
Figure 6:
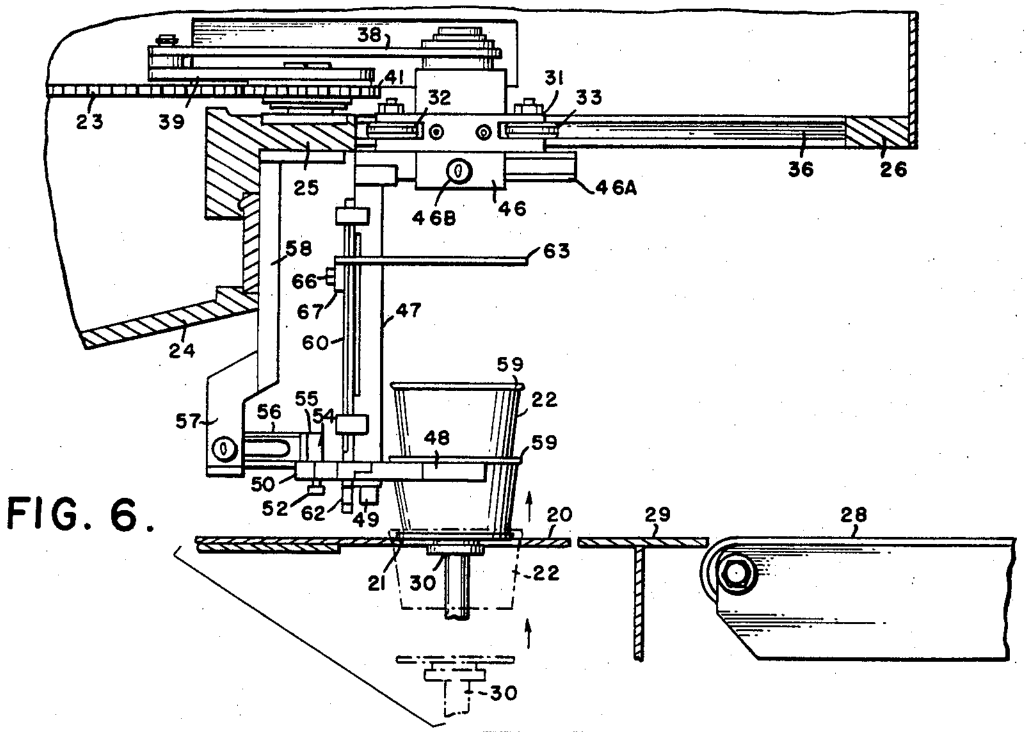
Figure 7:
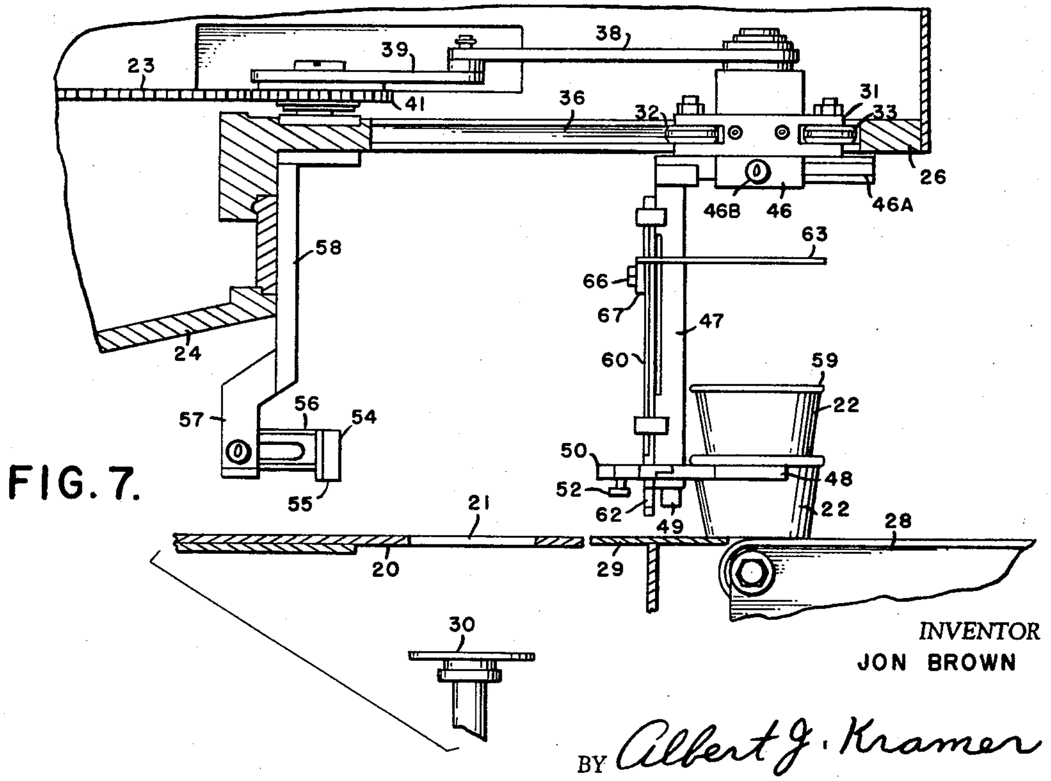
Figure 8:
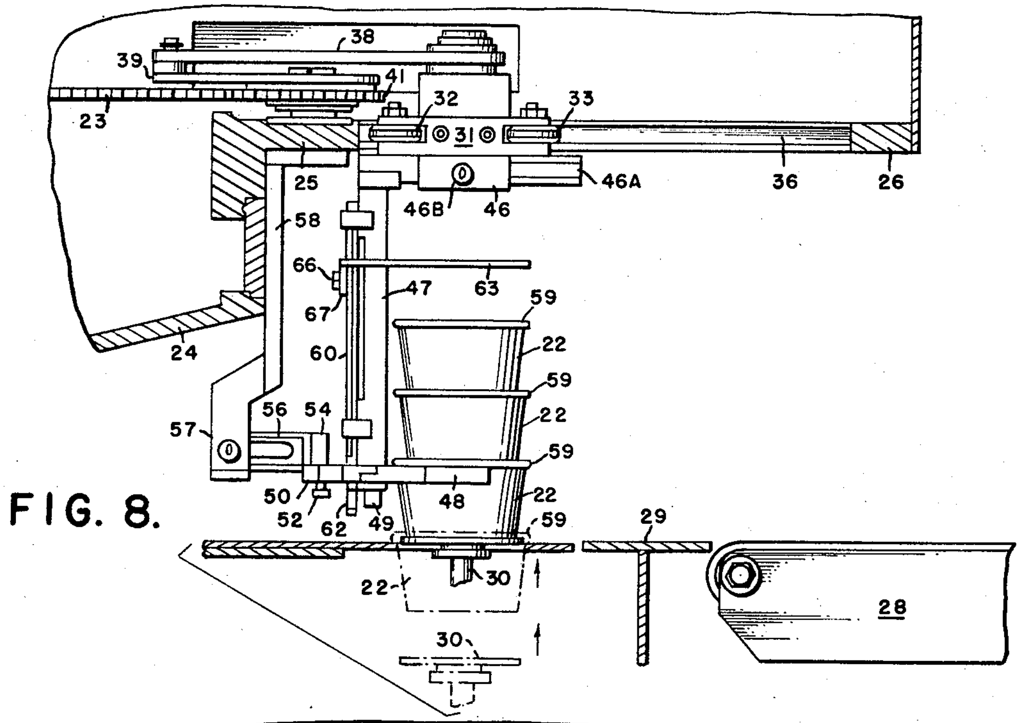
Figure 9:
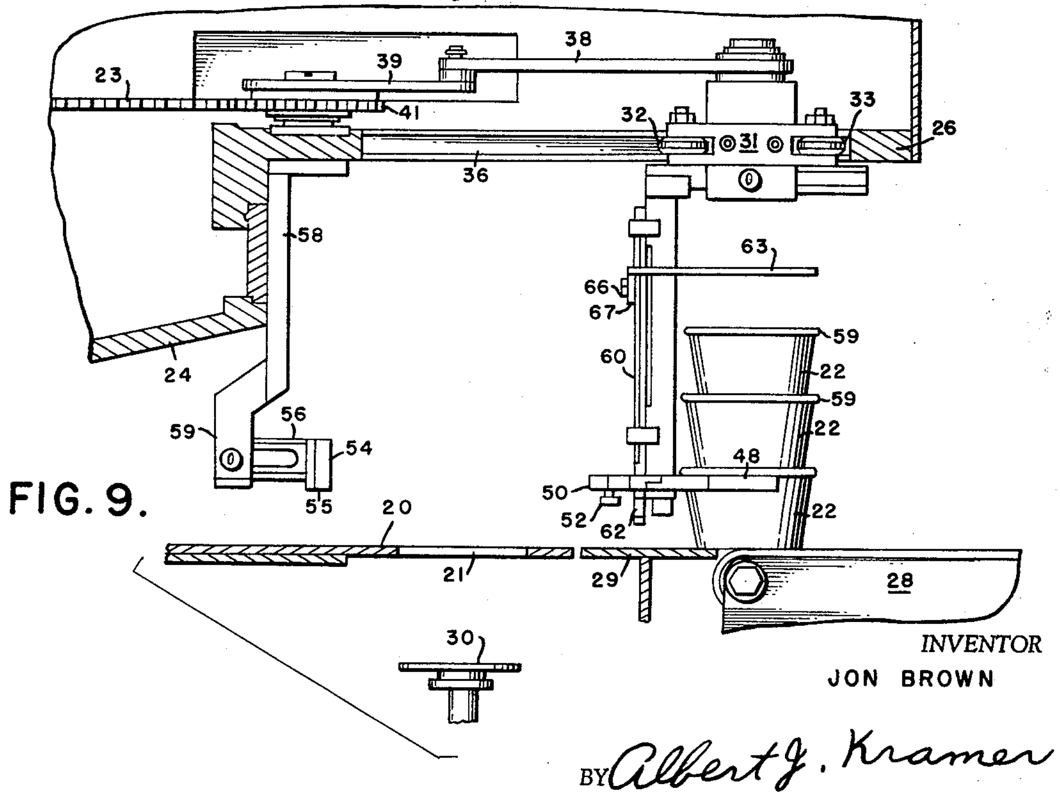
Figure 10:
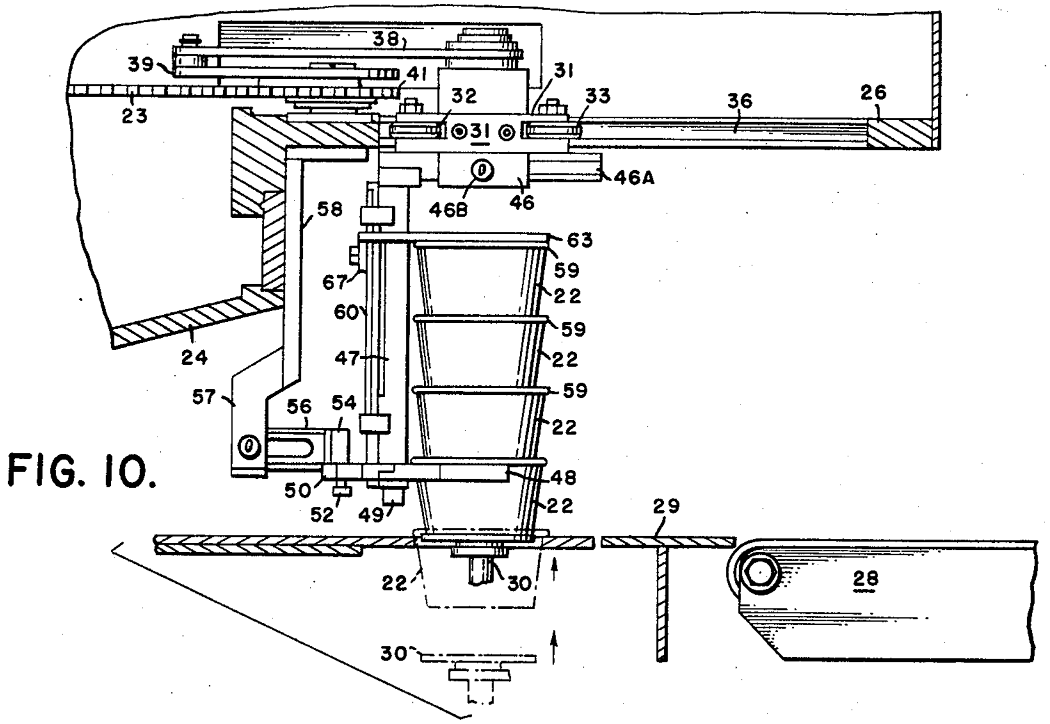
Figure 11:
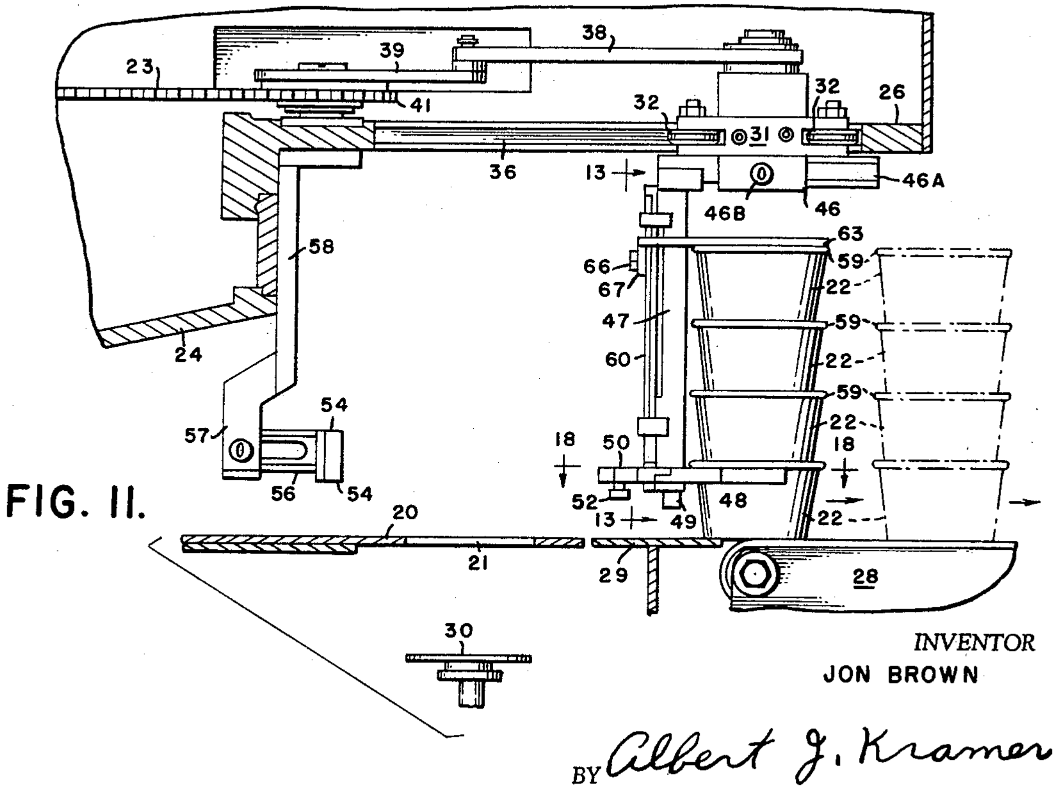
Figure 16:
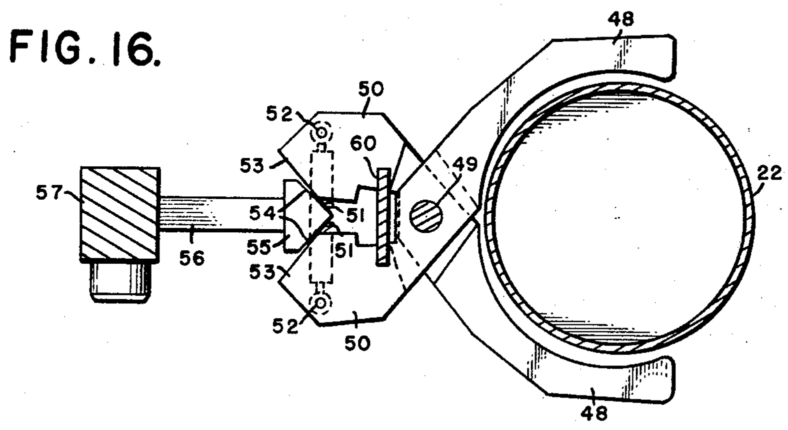
FIG. 16 is a sectional view along the line 16—16 of FIG. 4.

The carriage 31 then moves to the receiving station while the container is carried by the fingers. During this period the wheel 20 is rotated to bring another container 22 to the receiving station below the first container. See FIG. 6. In returning to the receiving station the fingers are again opened under the action of the cam 55 to release the first container, whereupon as the second container is moved upward by the elevating member 30 it contacts the bottom of the first container and both containers together are elevated. This part of the cycle is repeated as shown in FIGS. 7, 8, 9 and 10 until a stack is formed of the desired number of containers. (Four shown.) The completed stack is then ready to be discharged at the delivery station. In order to effect this discharge, the fingers 48, 48 must be retained in their open positions until the discharge operation has been completed. This is effected by means of a vertical bar 60 slidably mounted alongside the suspender 47. The lower portion of the bar is disposed between the finger extensions 50, 50. The bar is vertically movable between two positions: The first or lower position brings into adjacency the finger extensions with opposite recesses 61, 61 which results in no restriction on the operation of the fingers under the action of the spring 51 as shown in FIGS. 12 and 13. The second or upper position brings into adjacency the finger extensions with a wider portion 62 of the bar which abuts the finger extensions and thereby restrains closure. See FIGS. 13 and 18. The bar 60 is normally biased to the lower position under the action of gravity and is moved to the upper position by the uppermost article of a completed stack engaging an overhanging bifurcated cantilever 63 connected to the bar 60. By these means the fingers are restrained to retain their open positions so long as the full stack is present and are released therefrom only after the stack is removed by the belt conveyor 28 at the delivery station. The bar 60 moves to its lower position under the gravity bias when the member 47 returns to its initial position and the caming member 55 acts against the extensions 50, 50 to relieve side pressure of the extensions on the bar 60.

Upper and lower shoulders 64 and 65 contact the finger extensions 50, 50 to limit the vertical movement of the bar 60 to the two positions described above. See FIGS. 12 and 13. However, to provide for different stacking heights, the cantilever 63 is removably attached to the bar 60 by bolts 66 passing through flange 67 and anchored in threaded apertures 68 at different elevations.

I claim:

1. An article stacking device comprising a vertical member adapted to be reciprocated horizontally between a receiving station and a delivery station, means for serially moving articles in stacked relation upwardly alongside the member, means for releasably holding the bottommost article of the stack in fixed position relative to the member when the member moves from the receiving station to the delivery station, means for rendering inoperative said holding means when the member is at the receiving station and also when a predetermined number of articles have been arranged in stacked relation.

2. An article stacking device as defined by claim 1 and means at the delivery station for transferring the formed stacks from the member to a packing station.

3. An article stacking device as defined by claim 1 in which the holding means comprises a pair of scissors-like fingers adapted to contact opposite sides of the article, and means biasing said fingers in article holding relation.

4. An article stacking device as defined by claim 3 in which the means biasing the fingers in article holding relation are resilient.

5. An article stacking device as defined by claim 3, a vertical bar movable between a lower normal position and an upper position, said bar being biased to its downward position and adapted to engage the fingers in its upward position to prevent their assuming their article holding relation and in the lower normal position disengaging the fingers to permit such article holding relation, and a horizontal arm connected to the bar and overlying the article stacking area of the member, said arm being positioned so as to be elevated and to elevate the bar from its normal position to its upper position by a stack of articles of selected height.

6. An article stacking device as defined by claim 5 and means for releasably securing the arm to the bar in selected elevational positions so as to permit varying the height of the stack.

7. An article stacking device as defined by claim 5 in which the vertical bar is gravity biased to its normal lower position.

8. An article stacking device as defined by claim 1 and a belt conveyor at the delivery station for moving stacks of articles formed by the device to a packing station.

9. An article stacking device as defined by claim 5 in which the bar has a pair of notches on opposite sides at one elevational position to receive adjacent portions of the fingers in article holding position and an enlarged portion at a different elevational position to abut adjacent parts of the fingers in open position and prevent an article holding relation.

10. An article stacking device as defined by claim 3 in which the scissors-like fingers have cam follower extensions and camming means fixed at the receiving station for contacting said extensions when the member moves from the delivery station to the receiving station and forces the fingers to their open positions against the action of the biasing means.

References Cited

UNITED STATES PATENTS

| | | | |
|---|---|---|---|
| 3,054,515 | 9/1962 | Nawman | 214—6.2 |
| 3,225,889 | 12/1965 | West | 198—20 |

ROBERT G. SHERIDAN, *Primary Examiner.*

R. J. SPAR, *Assistant Examiner.*